United States Patent [19]
Fisher et al.

[11] 3,897,447
[45] July 29, 1975

[54] ANTHELMINTIC 1,2,4-OXADIAZOLINES

[75] Inventors: Michael H. Fisher, Bridgewater Twp., Somerville County; Alexander R. Matzuk, Colonia, both of N.J.

[73] Assignee: Merck & Co., Inc., Rahway, N.J.

[22] Filed: Apr. 30, 1973

[21] Appl. No.: 355,848

[52] U.S. Cl........... 260/307 F; 260/564 G; 424/272
[51] Int. Cl.............................................. C07d 85/52
[58] Field of Search................................. 260/307 F

[56] References Cited
OTHER PUBLICATIONS

Ainsworth et al. – J. Med. Chem. 10 (2), 208–211, (1967).

Primary Examiner—Donald G. Daus
Assistant Examiner—Raymond V. Rush
Attorney, Agent, or Firm—J. Jerome Behan; Edmunde D. Riedl; David L. Rose

[57] ABSTRACT

3-Substituted-4,5-dihydro-1,2,4-oxadiazoles, especially 3-$C_1$-$C_4$ alkyl, together with 3-phenyl and 3-halo substituted phenyl-4,5-dihydro-1,2,4-oxadiazoles are useful as anthelmintic agents.

2 Claims, No Drawings

ANTHELMINTIC 1,2,4-OXADIAZOLINES

DISCLOSURE OF THE INVENTION

This invention relates to novel compounds useful as anthelmintics. More particularly, this invention relates to novel 3-substituted-4,5-dihydro-1,2,4-oxadiazoles and to methods for their preparation.

Helminthiasis is an infection wherein a host animal supports a parasitic worm population. Sometimes, the infection is fatal. More often, however the infection is subacute or chronic, and the only overt symptom in an infected host animal is a failure to thrive on a less than optimal utilization of feed. In humans, such subacute infections are reflected in a lethargy characterized by both a decreased initiative and a decreased ability to perform, as well as an impairment of general health.

In animals, the economic consequences of an acute fatal infection are clearly obvious. Not so obvious, however, are the economic losses which accompany animals which suffer subacute infections. Such subacute infections are burdensome not only in terms of increased cost to the ultimate consumer, but also in terms of wasting scarce feed resources which would otherwise be employed to increase scarce supplies of meat for food, e.g. beef and mutton. The debilitating effects of such subacute infections further result in decreased carcass quality of food animals and also in increased susceptibility of such the animals to other diseases, as well as decreased feed efficiency.

Although drugs which are useful against helminthiasis are known, the individual species of helminths which are capable of provoking infection are not uniformly susceptible to an individual drug. In other words, the spectrum of activity differs with the anthelmintic employed. A broad spectrum of activity is especially desirable since the accurate diagnosis of the particular parasites affecting the individual animals of a herd or flock is not always feasible. In addition, resistance to an individual drug can develop. Thus additional chemotherapeutic agents which, either alone or in combination with other known anthelmintics, can provide a more complete spectrum of activity or provide a means for overcoming drug resistance to a species of parasites are much in demand.

Furthermore, in order to be more useful in commercial administration to animal herds, an anthelmintic preferably is suitable for administration in a variety of ways including oral and parenteral routes. To be useful upon administration, the active drug must be stable in whatever carriers or vehicles are employed and not undergo chemical decomposition. Some known anthelmintics such for instance as 3-methyl-1,2,4-oxadiazole, although pharmacologically effective, have not found commercial acceptance at least in part because of problems associated with their stability.

Therefore the primary object of this invention is to provide a drug which is effective against a broad spectrum of helminths either administered alone or in combination with other known anthelmintics.

A further object of this invention is to provide a stable anthelmintic which, if desired, can be administered by a variety of means including orally by admixture with rations, e.g. feed or water; as a drench or bolus; or by parenteral routes such as subcutaneously.

In meeting these objects together with other objects and advantages which will become apparent from a reading of this disclosure, there are provided compounds of the formula:

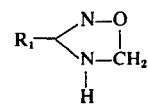

wherein $R_1$ is $C_1$ to $C_4$ alkyl, preferably methyl, ethyl, or isopropyl; an $R_2$ substituted phenyl or benzyl where $R_2$ is halogen or a group having an electronegativity substantially equivalent to halogen, e.g. trihalomethyl, especially trifluoromethyl, cyano, and the like. The substituent on the phenyl or benzyl group is preferably in the para-position, although ortho and meta substitutions are satisfactory. The preferred $R_2$ substituents are p-chloro and p-bromo on either the phenyl or benzyl group.

Such compounds of this invention are effective against helminths generally including the common helminths of sheep and cattle such as e.g. Strangyles and Trichostrangyles.

The compounds of this invention are prepared by reacting an $R_1$ substituted nitrile with an hydroxylamine salt, e.g. the hydrochloride to form the intermediate amidoxime.

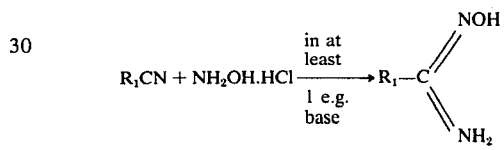

The resulting amidoxime is then reacted with formaldehyde or a formaldehyde source, e.g. paraformaldehyde to produce the desired 3-$R_1$-4,5-dihydro-1,2,4-oxadiazole.

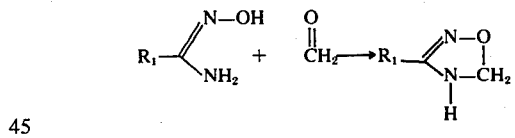

where $R_1$ is as defined above.

In general the reaction for preparing the amidoxime is carried out by methods known in the art. For example, the reaction of the appropriate nitrile with hydroxylamine hydrochloride is carried out in a solution of alkali carbonate in aqueous ethanol.

After recovery by standard procedures, the amidoxime is reacted with formaldehyde to form the cyclic oxadiazole. The reaction of the amidoxime with formaldehyde takes place over a wide temperature range, although the reflux temperature of the reaction mixture is preferred for convenience. If a temperature above the reflux temperature is deemed desirable, a pressure system can suitably be employed. The reaction time, of course, varies with the identity of the reactants, and the temperature of reaction, higher reaction temperatures requiring a shorter reaction time. Reaction times of from 2–36 hours at temperatures of 70°–250°C. can be employed. The preferred time and temperature of reaction is 2–6 hours at reflux.

Although an equimolar quantity of amidoxime and formaldehyde is sufficient and satisfactory, an excess of formaldehyde is preferred. After reaction is complete, the 3-substituted-4,5-dihydro-1,2,4-oxadiazoles of this invention can be recovered from the reaction mixture by standard distillation and purification techniques.

The nitrogen in the 4-position of the 3-substituted-4,5-dihydro-1,2,4-oxadiazole is sufficiently basic to form acid addition salts with stronger acids having a physiologically acceptable anion. This ability to form acid addition salts can be advantageously employed in purification procedures as well as the choice of the product form used for administration. For example, the hydrochloride salt can be dissolved in sterile water for parenteral administration or can be administered orally in the drinking water. Such salts are prepared by techniques well known in the art from acids such as hydrochloric, hydrobromic, hydroiodic, sulfuric, phosphoric, oxalic and the like to form the corresponding chloride, bromide, iodide, sulfate, phosphate and oxalate acid addition salts.

As hereinbefore stated, the compounds of this invention are useful as anthelmintics. For treatment of helminthiasis, the compounds of this invention are administered in dosages of from about 1 to 200 mg./kg. of host body weight. The optimum dosage is, of course, a function of the host, the species of parasite, the severity of the infection, and the route of administrattion and whether administered as a single or a multiple dosage.

In general, for administration to sheep or cattle having an average burden of the commonly encountered helminths, a dosage of 10 to 100 mg./kg. of body weight administered orally or parenterally is effective in achieving substantial reductions in the worm burden. For severe infections, it may be necessary to increase the dose or the frequency of dosage. The compounds of this invention show little or no toxic symptoms within the recommended dosage range.

As aforementioned, the compounds can be advantageously administered in a number of dosage forms each suited for the chosen route of administration, and also depending upon the particular animal, the type of anthelmintic treatment normally given to such an animal, the materials, and the particular helminths. A single efficacious oral or parenteral dose at a time when fluke or nematode infection is apparent or suspected is preferred. They may be used alone or in combination with other anthelmintics, parasiticides or antibacterials.

When compositions containing the active anthelmintic compound are used, the amounts of the anthelmintic ingredient in the composition, as well as the remaining constituents, will vary according to the type of treatment, the host animal, and the particular parasitic diesease. In general, however, compositions containing a total weight percent of the active compound or compounds ranging from 0.001 to 95% will be suitable with the remainder being any suitable carrier or vehicle. Furthermore, the compositions should contain enough of the active compound to provide an effective dosage for the proper treatment of the parasitic disease. As stated above, animals are preferably treated at a time when the infestation is apparent or suspected, preferably by a single parenteral dose, most preferably subcutaneously. Similarly, the amounts of drug present in the feed may be reduced to levels in the order of 0.001 to 3.0 weight percent based on the weight of feed, and the medicated feed administered over prolonged periods. This would be in the nature of a preventive or prophylactic measure but is not preferred. Another method of administering the compounds of this invention to animals whose feeds are conveniently pelleted, such as sheep, is to incorporate them directly in the pellets. For instance, the anthelmintic compound is readily incorporated in nutritionally adequate alfalfa pellets at levels of 2 to 110 grams per pound of pellets for therapeutic use, and at lower levels for prophylactic use, and such pellets fed to the animals.

A number of modes of treatment may be used, and each to some extent determines the general nature of the composition. For example, the anthelmintic compounds may be administered to domesticated animals in a single unit oral dosage form such as a tablet, bolus, capsule or drench, or in the liquid oil base form suitable for parenteral administration; or they may be compounded as a feed premix to be later admixed with the animal's food.

When the compositions are to be solid unit dosage forms, such as in tablets, capsules, or boluses, the ingredients other than the active compounds may be any other pharmaceutically acceptable vehicles convenient in the preparation of such forms, and preferably materials nutritionally suitable, such as starch, lactose, talc, magnesium separate and vegetable gums. In capsules, the active compound may be used in essentially undiluted form, the only extraneous material being that of the capsule casing itself, which may be hard or soft gelatin or any other pharmaceutically acceptable encapsulating material. When the dosage form is suitably admixed with an acceptable oil base vehicle, preferably of the vegetable oil variety, such as peanut oil or cottonseed oil. In all of such forms, i.e., in tablets, boluses, capsules, and oil base formulations, the active compound conveiently ranges from about 5 to 80% by weight of the total composition. As hereinbefore stated the compounds may also be added in the form of the acid addition salt to the drinking water.

When the unit dosage form is to be in the form of a drench, the anthelmintic agents may be mixed with agents which will aid in the subsequent suspending of the active compound in water, such as bentonite, clays, water-soluble starches, cellulose derivatives, gums and surface active agents, to form a dry pre-drench composition, which is added to water just before use. In the pre-drench formulation, in addition to the suspending agent, such ingredients as preservatives and anti-foam compounds may be included. Such a dry product may contain as much as 95% by weight of the active compound, the rest being contributed by the excipients. Preferably, the solid composition contains from 30 to 95% by weight of the active compound. Enough water should be added to the solid product to provide the proper dosage level within a convenient amount of liquid for a single oral dose. The commonly used measure in the field is one fluid ounce of material and thus that 1 fluid ounce of material should contain enough of the anthelmintic compounds to provide the effective dosage level. Liquid drench formulations containing from about 10 to 30 weight percent of dry ingredients will in general be suitable, with the preferred range being from 15 to 50 weight percent.

Where the compositions are intended to be used as feeds, feed supplements or feed pre-mixes, they will be mixed with suitable ingredients of an animal's nutrient ration. The solid orally ingestible carriers normally used for such purposes, such as distillers' dried grains, corn germ cake, corn meal, citrus meal, fermentation residues, ground oyster shells, Attapulgus clay, wheat shorts, molasses soluble, corn cob meal, edible vegetable substances, toasted dehulled soya flour, soybean mill feed, antibiotic mycelia, soya grits and crushed limestone, are all suitable. The active compounds are intimately dispersed or admixed throughout the solid inert carrier by methods such as grinding, stirring, milling or tumbling. By selecting proper diluents and by altering the ratio of carrier to active ingredient, compositions of any desired concentration may be prepared. Feed supplement formulations containing from about 10 to 30% by weight of active ingredient are particularly suitable for addition to feeds. The active compound is normally dispersed or mixed uniformly in the diluent but in some instances may be adsorbed on the carrier.

These supplements are added to the finished animal feed in an amount adequate to give the final concentration desired for controlling or treating the helminth infection by way of the animal ration. Although the preferred level in feeds will depend on the particular compound, 0.05 to 25% by weight of the active compounds of this invention is normally included in the feed.

The following examples show the preparation of specific embodiments of the present invention; they are given here merely as illustrations and are not meant to limit the invention in any respect.

EXAMPLE I

Acetamidoxime

A 22 l. 3-neck round bottom flask fitted with a mechanical stirrer, a reflux condenser, a thermometer and a heating mantle, is charged with 1946 g. hydroxylamine hydrochloride and 11.2 l. of 80% aqueous ethanol with stirring. After the hydroxylamine hydrochloride dissolves, 1148 g. of acetonitrile is added followed by the addition of 1932 g. anhydrous potassium carbonate. The reaction mixture is heated with stirring. There is a gas evolution until the temperature of the reaction mixture reaches about 65°C., then a more vigorous reaction starts. After the reaction subsides, the mixture is refluxed for 16 hours. It is then filtered and the solid washed with hot ethanol. The combined filtrate is evaporated in vacuo; 10 l. benzene added, and again evaporated. The final dried residue is recrystallized from 8 l. isopropyl alcohol, followed by washing with cold isopropyl alcohol and ether.

The first crop of crystals has a melting point of 137° to 139°C. and yields 1088.8 gms. The second crop has a melting point of 136° to 138°C. and gives 131.7 gms.

In an analogous manner but employing respectively
p-chlorobenzonitrile;
p-chlorphenylacetonitrile;
p-bromobenzonitrile;
p-bromophenylacetonitrile;
o-chlorobenzonitrile;
o-chlorophenylacetonitrile;
o-bromophenylacetonitrile;
o-bromobenzonitrile;
propionitrile; and isobutyronitrile, in place of and in like molar quantity to the acetonitrile, there are respectively prepared:
p-chlorobenzamidoxime;
p-chlorophenylacetamidoxime;
p-bromobenzamidoxime;
p-bromophenylacetamidoxime;
o-chlorobenzamidoxime;
o-chlorophenylacetamidoxime;
o-bromophenylacetamidoxime;
o-bromobenzamidoxime;
propioamidoxime; and isobutyroamidoxime.

EXAMPLE II

3-Methyl-4,5-Dihydro-1,2,4-Oxadiazole

A mechanically stirred mixture of 370 g. (5 moles) acetamidoxime and of 170 g. (5.67 moles) paraformaldehyde in 1000 ml. of water is heated at reflux for one hour. The resultant solution is cooled and 800 g. potassium carbonate is slowly added while maintaining the temperature below 30°. After addition is complete, the product is extracted from the mixture with three 500 ml. portions of ethyl acetate. The ethyl acetate fractions are combined and dried over magnesium sulfate, filtered, and evaporated in vacuo. A light yellow oil is obtained.

This oily residue is distilled at reduced pressure. The fraction distilling at 60° to 90°C. at 0.1 to 1.0 mm. is collected. The entire fraction is chromatographed on 600 gms. of silica gel (Baker silica gel), and eluted with chloroform, followed by increasing amounts of ethyl acetate. The final eluent is 1 part ethyl acetate:4 parts chloroform. The fractions containing the desired product are combined, evaporated in vacuo, and the residue distilled at reduced pressure. The 3-methyl-4,5-dihydro-1,2,4-oxadiazole distills at 69° at 0.1 mm.

In an analogous manner but employing respectively
p-chlorobenzamidoxime;
p-chlorophenylacetamidoxime;
p-bromobenzamidoxime;
p-bromophenylacetamidoxime;
o-chlorobenzamidoxime;
o-chlorophenylacetamidoxime;
o-bromophenylacetamidoxime;
o-bromobenzamidoxime;
propioamidoxime; and isobutyroamidoxime in place of and in like molar quantity to the acetamidoxime, there are respectively obtained:
3-(p-chlorobenzyl)-4,5-dihydro-1,2,4-oxadiazole;
3-(p-chlorophenyl)-4,5-dihydro-1,2,4-oxadiazole;
3-(p-bromobenzyl)-4,5-dihydro-1,2,4-oxadiazole;
3-(p-bromophenyl)-4,5-dihydro-1,2,4-oxadiazole;
3-(o-chlorobenzyl)-4,5-dihydro-1,2,4-oxadiazole;
3-(o-chlorophenyl)-4,5-dihydro-1,2,4-oxadiazole;
3-(o-bromophenyl)-4,5-dihydro-1,2,4-oxadiazole;
3-(o-bromobenzyl)-4,5-dihydro-1,2,4-oxadiazole;
3-ethyl-4,5-dihydro-1,2,4-oxadiazole; and
3-isopropyl-4,5-dihydro-1,2,4-oxadiazole.

Now having described the invention, we claim:
1. A compound of the formula =

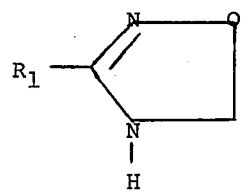

wherein $R_1$ is $C_1$ to $C_4$ alkyl.
2. A compound according to claim 1 in which $R_1$ is methyl.

* * * * *